United States Patent [19]

Sano et al.

[11] Patent Number: 4,746,639
[45] Date of Patent: May 24, 1988

[54] DIELECTRIC CERAMIC COMPOSITION

[75] Inventors: Harunobu Sano, Nagaokakyo; Yukio Sakabe, Funai; Goro Nishioka, Ibaraki, all of Japan

[73] Assignee: Murata Manufacturing Co., Ltd., Japan

[21] Appl. No.: 62,165

[22] Filed: Jun. 12, 1987

[30] Foreign Application Priority Data

Jun. 14, 1986 [JP] Japan ................. 61-138897

[51] Int. Cl.$^4$ .................. C04B 35/46; C04B 35/50
[52] U.S. Cl. .................................................. 501/136
[58] Field of Search ............................. 501/136, 152

[56] References Cited

U.S. PATENT DOCUMENTS

| | | | |
|---|---|---|---|
| 4,388,416 | 6/1983 | Sakabe et al. | 501/136 |
| 4,482,934 | 11/1984 | Hirota et al. | 501/136 |
| 4,485,181 | 11/1984 | Sakabe et al. | 501/136 |
| 4,552,853 | 11/1985 | Kawabata et al. | 501/136 |

FOREIGN PATENT DOCUMENTS

| | | | |
|---|---|---|---|
| 53-68899 | 6/1978 | Japan | 501/136 |
| 53-114812 | 10/1978 | Japan | 501/136 |

*Primary Examiner*—Mark L. Bell
*Attorney, Agent, or Firm*—Ostrolenk, Faber, Gerb & Soffen

[57] ABSTRACT

A dielectric ceramic composition consists essentially of a basic component composed of 35 to 70 wt % of $SrTiO_3$, 0.5 to 16 wt % of $MgTiO_3$, 1.0 to 12 wt % of $CaTiO_3$, 5 to 32 wt % of $Bi_2O_3$ and 5 to 16 wt % of $TiO_2$, and additives composed of CuO, $MnO_2$ and $CeO_2$. The contents of the additives per 100 parts by weight of the main component are 0.05 to 1.0 parts by weight for CuO, 0.02 to 0.5 parts by weight for $MnO_2$, and 1.0 to 8.0 parts by weight for $CeO_2$, respectively. The composition possesses a high dielectric constant of more than 500, a high Q value of more than 1000 at 1 MHz, a small temperature change rate of capacitance of a maximum of −7.2% at +85° C., and a small change rate of capacitance with direct current voltage.

7 Claims, No Drawings

DIELECTRIC CERAMIC COMPOSITION

FIELD OF THE INVENTION

This invention relates to a dielectric ceramic composition and, more particularly, to a high permittivity dielectric ceramic composition.

BACKGROUND OF THE INVENTION

So far, dielectric ceramic compositions of a barium titanate system have widely been put into practical use as a high permittivity ceramic dielectrics. However, the dielectric ceramics of this system have large dielectric loss at high frequencies and poor linearity of the temperature change rate of dielectric constant. In addition, they have the disadvantage that the capacitance is considerably decreased by application of a direct current voltage.

On the other hand, extensive efforts have been made to solve these problems and have led to development of dielectric ceramics of a system $SrTiO_3$-$Bi_2O_3$-$TiO_2$-$PbTiO_3$-$CaTiO_3$-$CuO$ (Japanese patent application laid-open No 53-29599) or a system $SrO$-$CaO$-$Bi_2O_3$-$TiO_2$-$Pb_3O_4$-$MgO$ (Japanese patent application laid-open No. 57-92703).

The compositions of the former system $SrTiO_3$-$Bi_2O_3$-$TiO_2$-$PbTiO_3$-$CaTiO_3$-$CuO$ possess high quality factor ($Q = 1/\tan \delta$) at low frequencies of the order of 455 KHz, but they considerably decrease in the quality factor at high frequencies of not less than 1 MHz. It is therefore impossible with this system to produce ceramic dielectrics for new applications which are continually increasing the operating frequency range. In the latter system $SrO$-$CaO$-$Bi_2O_3$-$TiO_2$-$Pb_3O_4$-$MgO$, ceramic compositions may have a high dielectric constant of the order of 500. However, such compositions have a large temperature coefficient of dielectric constant of the order of $-2000$ ppm/° C., and the change rate of capacitance with temperature is $-13$ % at $+85°$ C. It is also possible with the latter system to produce dielectric ceramic compositions having a small change rate of capacitance with temperature, but their dielectric constant is low and of the order of 300. In addition, since all the compositions of these systems contain PbO, there is an inevitable evaporation of lead during sintering, resulting in variations in dielectric characteristics of the products. Thus, the sintering of these compositions requires special precautions to minimize the evaporation of lead and that causes many problems in mass production.

SUMMARY OF THE INVENTION

It is an object of the present invention to provide a dielectric ceramic composition with a dielectric constant of more than 500, low direct current voltage dependency of the dielectric constant, a small change rate of capacitance with temperature, and low dielectric loss.

According to the present invention, the above and other objects are achieved by providing a dielectric ceramic composition consisting essentially of a basic component composed of 35 to 70 wt % of $SrTiO_3$, 0.5 to 16 wt % of $MgTiO_3$, 1.0 to 12 wt % of $CaTiO_3$, 5 to 32 wt % of $Bi_2O_3$ and 5 to 16 wt % of $TiO_2$, and additives composed of $CuO$, $MnO_2$ and $CeO_2$, the content of said additives per 100 parts by weight of the main component being 0.05 to 1.0 parts by weight for $CuO$, 0.02 to 0.5 parts by weight for $MnO_2$, and 1.0 to 8.0 parts by weight for $CeO_2$.

DETAILED DESCRIPTION OF THE INVENTION

The dielectric ceramic composition according to the present invention has a dielectric constant of more than 500, low voltage dependency of the dielectric constant, small change rate of capacitance with temperature and a low dielectric loss. Since the composition contains no volatile lead oxide, it is possible to mass produce capacitive elements and dielectric insulators with uniform dielectric characteristics.

The dielectric ceramic composition according to the present invention may be prepared in the conventional manner. Raw materials for the dielectric ceramic composition of the present invention may be used in the form of oxides, carbonates and other compounds which may be converted into oxides of the respective elements during sintering. Also, the raw materials may be used in the form of perovskite type compounds such as $SrTiO_3$, $MgTiO_3$, $CaTiO_3$ and the like.

The contents of the respective components in the basic component have been limited to values within the above respective ranges for the following reasons: If the content of $SrTiO_3$ is less than 35 % by weight, the dielectric constant becomes low and less than 500. If the content of $SrTiO_3$ exceeds 70 % by weight, the temperature coefficient of dielectric constant becomes large and exceeds $-1200$ ppm/° C. Thus, the content of $SrTiO_3$ has been limited to a value within the range of 35 to 70 % by weight.

If the content of $MgTiO_3$ is less than 0.5 % by weight, the bias characteristics of the products becomes worse and the sintering property becomes lowered. If the content of $MgTiO_3$ exceeds 16 % by weight, the Q value at 1 MHz becomes small and less than 1000. For these reasons, the content of $MgTiO_3$ has been limited to a value within the range of 0.5 to 16 % by weight.

If the content of $CaTiO_3$ is less than 1.0 % by weight, the Q value at 1 MHz becomes small and less than 1000 and the bias characteristics of the products becomes worse. If the content of $CaTiO_3$ exceeds 12 % by weight, the dielectric constant becomes low and less than 500. For the reasons, the content of $CaTiO_3$ has been limited to a value within the range of 1.0 to 12 % by weight.

If the content of $Bi_2O_3$ is less than 5 % by weight, the dielectric constant becomes low and less than 500. If the content of $Bi_2O_3$ exceeds 32 % by weight, the Q value at 1 MHz becomes small and less than 1000. Thus, the content of $Bi_2O_3$ has been limited to a value within the range of 5 to 32 % by weight.

If the content of $TiO_2$ is less than 5 % by weight, the dielectric constant becomes low and less than 500. If the content of $TiO_2$ exceeds 16 % by weight, the Q value at 1 MHz becomes small and less than 1000. For these reasons, the content of $TiO_2$ has been limited to a value within the range of 5 to 16 % by weight.

The additives $CuO$, $MnO_2$ and $CeO_2$ are incorporated into the basic component to improve the dielectric constant and the quality factor Q of the composition. The contents of these additives have been respectively limited to a value within the above ranges for the following reasons: If the content of $CuO$ is less than 0.05 part by weight per 100 parts by weight of the main component, the Q value at 1 MHz becomes small and less than 1000. If the content of $CuO$ exceeds 1.0 part by weight, the dielectric constant becomes low and less than 500. Thus, the content of CuO has been limited to a value within the range of 0.05 to 1.0 parts by weight per 100 parts by weight of the main component.

If the content of $MnO_2$ is less than 0.02 part by weight per 100 parts by weight of the main component, the Q value at 1 MHz becomes small and less than 1000. If the content of $MnO_2$ exceeds 0.5 part by weight, the sintering properties become worse. Thus, the content of $MnO_2$ has been limited to a value within the range of 0.02 to 0.5 parts by weight per 100 parts by weight of the main component.

Finally, if the content of $CeO_2$ is less than 1.0 parts by weight per 100 parts by weight of the main component, the Q value at 1 MHz becomes small and less than 1000. If the content of $CeO_2$ exceeds 8.0 parts by weight, the dielectric constant becomes low and less than 500. Thus, the content of $CeO_2$ has been limited to a value within the range of 1.0 to 8.0 parts by weight per 100 parts by weight of the main component.

The present invention will be further apparent from the following description with reference to examples thereof.

EXAMPLES

Industrial materials with purity of 99.5 %, $SrCO_3$, $MgCO_3$, $CaCO_3$, $Bi_2O_3$, $TiO_2$, CuO, $MnO_2$ and $CeO_2$ were used as raw materials. Test specimens Nos. 1 to 20 were prepared in the following manner: Firstly, the raw materials $SrCO_3$, $MgCO_3$, $CaCO_3$ and $TiO_2$ were weighed and milled in a ball mill to prepare mixtures for preparation of $SrTiO_3$, $MgTiO_3$ and $CaTiO_3$. Each of the resultant mixtures was calcined at 950 ° C. for 2 hours, crushed and milled to prepare calcined powders of $SrTiO_3$, $MgTiO_3$ and $CaTiO_3$. The resultant powders were weighed together with $Bi_2O_3$, $TiO_2$, CuO, $MnO_2$ and $CeO_2$ to prepare mixtures each having a composition shown in Table 1, and then ball milled by the wet process together with 3 parts by weight of polyvinyl alcohol binder, using a polyethylene pot with alumina balls. Each mixture was dried, granulated and then compacted into disks with a diameter of 10 mm and a thickness of 1.2 mm under a pressure of 2000 $Kg/cm^2$. The disks were fired at a temperature ranging from 1100 to 1230° C. to prepare ceramic disks. The resultant ceramic disks were applied on the opposite sides with silver paste and then baked at 800° C. to form electrodes.

Test specimen No. 21 was prepared in the following manner: Raw materials $SrCO_3$, $MgCO_3$, $CaCO_3$, $Bi_2O_3$, $TiO_2$, CuO, $MnO_2$ and $CeO_2$ were weighed and milled with a ball mill to prepare a mixture having a composition shown in Table 1, calcined at 950° C. for 2 hours, crushed and then ball milled by the wet process together with 3 parts by weight of polyvinyl alcohol binder. The resultant mixture was dried, granulated and then compacted into disks with a diameter of 10 mm and a thickness of 1.2 mm under a pressure of 2000 $Kg/cm^2$. The disks were fired at a temperature ranging from 1100° to 1230° C. to prepare ceramic disks. The resultant ceramic disks were applied on the opposite sides with silver paste and then baked at 800° C. to form electrodes.

The thus prepared test specimens were subjected to measurements of dielectric properties. The measurements were made on the dielectric constant ($\epsilon$), quality factor (Q), change rate of capacitance with voltage, and change rate of capacitance with temperature. The dielectric constant ($\epsilon$) and quality factor (Q) were measured at 1 MHz, 1 vrms and at 20° C. The change rate of capacitance with voltage (voltage change rate of capacitance) was determined by applying a direct current biasing field of 5 KV/mm. The change rate of capacitance with temperature (temperature change rate of capacitance) was determined by values measured at $-25°$ C., $+20°$ C. and $+85°$ C. and given by the equation:

$$\Delta C/C_{20} = \frac{(C_t - C_{20})}{C_{20}}$$

where $C_t$ is the capacitance measured at $-25°$ C. or $+85°$ C., and $C_{20}$ is that at 20° C.

The results are shown in Table 2. In Tables 1 and 2, the specimens with an asterisk (*) are those having a composition beyond the scope of the present invention.

TABLE 1

| No. | basic component (wt %) | | | | | additives (parts by weight) | | |
|---|---|---|---|---|---|---|---|---|
| | $SrTiO_3$ | $CaTiO_3$ | $MgTiO_3$ | $Bi_2O_3$ | $TiO_2$ | CuO | $MnO_2$ | $CeO_2$ |
| 1 | 56.9 | 4.5 | 1.2 | 27.8 | 9.6 | 0.2 | 0.15 | 2.0 |
| 2 | 47.6 | 3.9 | 8.9 | 29.6 | 9.9 | 0.2 | 0.15 | 2.0 |
| 3 | 54.3 | 1.1 | 13.2 | 23.1 | 8.3 | 0.4 | 0.1 | 1.0 |
| 4 | 49.6 | 4.0 | 13.2 | 24.9 | 8.5 | 0.2 | 0.1 | 5.0 |
| 5 | 38.3 | 7.1 | 13.4 | 30.7 | 10.5 | 0.2 | 0.2 | 2.0 |
| 6 | 69.8 | 5.3 | 5.0 | 14.8 | 5.1 | 0.05 | 0.2 | 2.0 |
| 7 | 51.6 | 9.6 | 0.5 | 28.4 | 9.8 | 0.5 | 0.2 | 3.0 |
| 8 | 50.6 | 4.2 | 15.8 | 20.2 | 9.2 | 0.2 | 0.1 | 3.0 |
| 9 | 40.4 | 5.3 | 13.4 | 30.5 | 10.4 | 0.8 | 0.1 | 8.0 |
| 10 | 61.1 | 1.2 | 0.7 | 27.8 | 9.2 | 0.3 | 0.1 | 1.0 |
| 11 | 52.0 | 2.0 | 13.1 | 24.5 | 8.4 | 0.4 | 0.15 | 5.0 |
| 12 | 47.3 | 3.0 | 2.2 | 32.0 | 15.5 | 0.8 | 0.15 | 2.0 |
| 13 | 58.6 | 2.1 | 0.7 | 28.8 | 9.8 | 0.3 | 0.15 | 1.0 |
| 14 | 44.7 | 1.7 | 13.1 | 30.0 | 10.3 | 0.3 | 0.15 | 1.0 |
| 15* | 47.4 | 8.8 | 4.3 | 29.5 | 10.1 | 0 | 0.2 | 0 |
| 16* | 59.8 | 2.3 | 4.1 | 24.2 | 9.6 | 0.2 | 0.2 | 0 |
| 17* | 61.3 | 11.4 | 6.3 | 4.8 | 16.2 | 1.0 | 0.1 | 1.0 |
| 18* | 63.8 | 5.2 | 11.6 | 14.4 | 4.9 | 0.02 | 0.1 | 3.0 |
| 19* | 33.5 | 15.3 | 13.1 | 23.4 | 14.7 | 0.7 | 0.2 | 5.0 |
| 20* | 42.9 | 7.9 | 8.7 | 30.1 | 10.3 | 0.4 | 0.2 | 10.0 |
| 21 | 47.3 | 3.0 | 2.2 | 32.0 | 15.5 | 0.8 | 0.15 | 2.0 |

TABLE 2

| No. | ε | Q | Temp. change rate of capacitance (%) | | Voltage Change rate of capacitance (%) at 5KV/mm |
|---|---|---|---|---|---|
| | | | −25° C. | +85° C. | |
| 1 | 824 | 1480 | 4.6 | −6.6 | +0.3 |
| 2 | 701 | 1120 | 3.2 | −4.4 | +1.1 |
| 3 | 920 | 1050 | 4.2 | −6.0 | +5.6 |
| 4 | 756 | 1130 | 3.2 | −4.8 | +2.3 |
| 5 | 509 | 1030 | 2.3 | −3.5 | +2.8 |
| 6 | 524 | 1650 | 5.3 | −7.2 | +0.7 |
| 7 | 601 | 1140 | 3.5 | −4.1 | +0.1 |
| 8 | 510 | 1090 | 3.6 | −5.0 | +7.6 |
| 9 | 509 | 1220 | 1.1 | −2.3 | +4.2 |
| 10 | 1082 | 1170 | 4.0 | −6.3 | +0.3 |
| 11 | 598 | 1130 | 3.3 | −5.2 | +5.0 |
| 12 | 730 | 1080 | 2.1 | −3.1 | +0.7 |
| 13 | 1120 | 1020 | 3.3 | −4.9 | +0.2 |
| 14 | 805 | 1000 | 2.0 | −3.3 | +8.2 |
| 15* | 712 | 310 | 3.4 | −13.0 | −1.2 |
| 16* | 1210 | 1480 | 4.6 | −6.6 | +0.3 |
| 17* | 401 | 1850 | 9.7 | −12.3 | −10.2 |
| 18* | 493 | 1130 | 6.3 | −9.8 | −0.7 |
| 19* | 392 | 1070 | 1.0 | −1.5 | +4.7 |
| 20* | 488 | 1230 | 4.5 | −5.8 | +3.3 |
| 21 | 750 | 1030 | 2.5 | −3.4 | +0.7 |

From the data shown in Table 2, the dielectric ceramic composition according to the present invention has a high dielectric constant of more than 500 and a high Q value of more than 1000 at 1 MHz. In addition, the dielectric constant is scarcely decreased even by the application of a direct current voltage of 5 KV/mm. Further, the temperature change rate of capacitance is considerably small and −7.2 % at the maximum at +85° C.

What is claimed is:

1. A dielectric ceramic composition consisting essentially of a basic component composed of 35 to 70 wt % of $SrTiO_3$, 0.5 to 16 wt % of $MgTiO_3$, 1.0 to 12 wt % of $CaTiO_3$, 5 to 32 wt % of $Bi_2O_3$ and 5 to 16 wt % of $TiO_2$, and additives composed of CuO, $MnO_2$ and $CeO_2$, the contents of said additives per 100 parts by weight of the main component being 0.05 to 1.0 parts by weight for CuO, 0.02 to 0.5 parts by weight for $MnO_2$, and 1.0 to 8.0 parts by weight for $CeO_2$.

2. A dielectric ceramic composition according to claim 1 in which the basic component is composed of 38.3 to 69.8 weight % of $SrTiO_3$, 0.5 to 15.8 weight % of $MgTiO_3$, 1.1 to 9.6 weight % of $CaTiO_3$, 14.8 to 32 weight % of $Bi_2O_3$ and 5.1 to 15.5 weight % of $TiO_2$.

3. A dielectric cermaic composition according to claim 2 in which the contents of said additives per 100 parts by weight of the main component is 0.05 to 0.8 parts by weight for CuO and 0.1 to 0.2 parts by weight for $MnO_2$.

4. A dielectric ceramic composition according to claim 3 in which the contents of said additives per 100 parts by weight of the main component is 0.2 to 0.8 parts by weight for CuO and 1 to 5 parts by weight for $CeO_2$.

5. A dielectric ceramic composition according to claim 4 in which the basic component is composed of 44.7 to 54.3 weight % of $SrTiO_3$, 13.1 to 15.8 weight % of $MgTiO_3$, 1.1 to 4.2 weight % of $CaTiO_3$, 20.2 to 30 weight % of $Bi_2O_3$ and 8.3 to 10.3 weight % of $TiO_2$, and the contents of said additives per 100 parts by weight of the main component is 0.2 to 0.4 parts by weight for CuO and 0.1 to 0.15 parts by weight for $MnO_2$.

6. A dielectric ceramic composition according to claim 1 in which the contents of said additives per 100 parts by weight of the main component is 0.05 to 0.8 parts by weight for CuO and 0.1 to 0.2 parts by weight for $MnO_2$. pg,15

7. A dielectric ceramic composition according to claim 6 in which the contents of said additives per 100 parts by weight of the main component is 0.2 to 0.8 parts by weight for CuO and 1 to 5 parts by weight for $CeO_2$.

* * * * *